United States Patent [19]

Bubon et al.

[11] Patent Number: 5,383,949
[45] Date of Patent: Jan. 24, 1995

[54] GLASS FOREHEARTH

[75] Inventors: Frank J. Bubon, Windsor; Kenneth J. Paul, Tolland; Steven J. Pinkerton, Avon, all of Conn.

[73] Assignee: Emhart Glass Machinery Investments Inc., Wilmington, Del.

[21] Appl. No.: 254,182

[22] Filed: Jun. 6, 1994

[51] Int. Cl.⁶ ............................................... C03B 5/23
[52] U.S. Cl. .................................. 65/346; 65/135.1; 65/136.4; 65/137; 65/356
[58] Field of Search ............... 65/135.1, 136.4, 137, 65/337, 346, 356

[56] References Cited

U.S. PATENT DOCUMENTS 4,655,812  4/1987  Blumenfeld ........................ 65/346

*Primary Examiner*—Joye L. Woodard
*Attorney, Agent, or Firm*—Spencer T. Smith

[57] ABSTRACT

A glass forehearth is disclosed which is made up of upstream and downstream zones each having a roof structure which divides the channel into opposed side channels separated by a central channel. The glass in the central channel is heated for at least a portion of its length enabling the flow rate of the forehearth to be decreased.

8 Claims, 3 Drawing Sheets

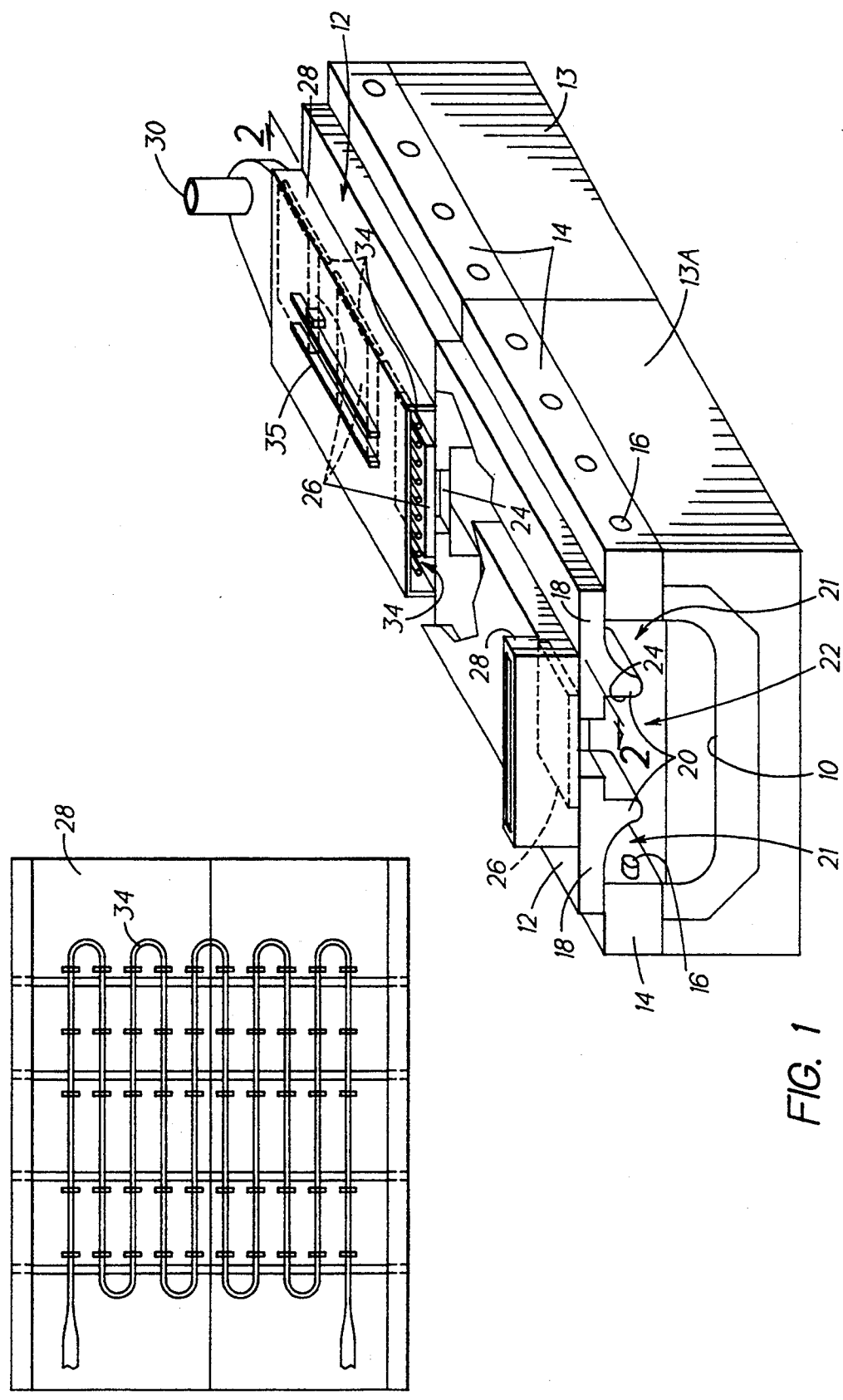

GLASS FOREHEARTH

BACKGROUND OF THE INVENTION

1. Field of the Invention

The present invention relates to glass forehearths which deliver a stream of molten glass to a spout bowl of a glass feeder which discharges vertical runners of molten glass, These runners are sheared into discrete gobs for processing through a glassware forming machine such as an I,S, or H-28 machine.

2. Description of the Prior Art

U.S. Pat. No. 4,552,579 illustrates a state of the art forehearth which has a plurality of cooling zones followed by an equalizing zone. The cooling zones are identical and are divided into three parallel channels by a pair of projections which project downwardly from the roof. During normal operation (an equilibrium operating state) heat is added to the side channels and removed from the central channel of these cooling zones as the molten glass flows through the forehearth. The length of the forehearth is defined for a specified maximum flow rate and accordingly, the forehearth will not operate optimally should the demand for molten glass (flow rate) be substantially reduced. Heated air in the side channels can be pulled into the central channel during start-up to reduce the start-up time (EPO Patent Application No. 0503883A1), but during normal operation, such will be discontinued.

SUMMARY OF THE INVENTION

It is accordingly an object of the present invention to provide a forehearth which can operate optimally either at the specified demand or at a greatly reduced demand, Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings:

FIG. 1 is an oblique view of the conditioning section of a forehearth for molten glass which is defined by two conditioning zones;

FIG. 3 is a view looking up into a portion of the refractory tunnel shown in FIG. 1 having a heating element secured to its roof;

DESCRIPTION OF THE PREFERRED EMBODIMENTS

Figure 2:
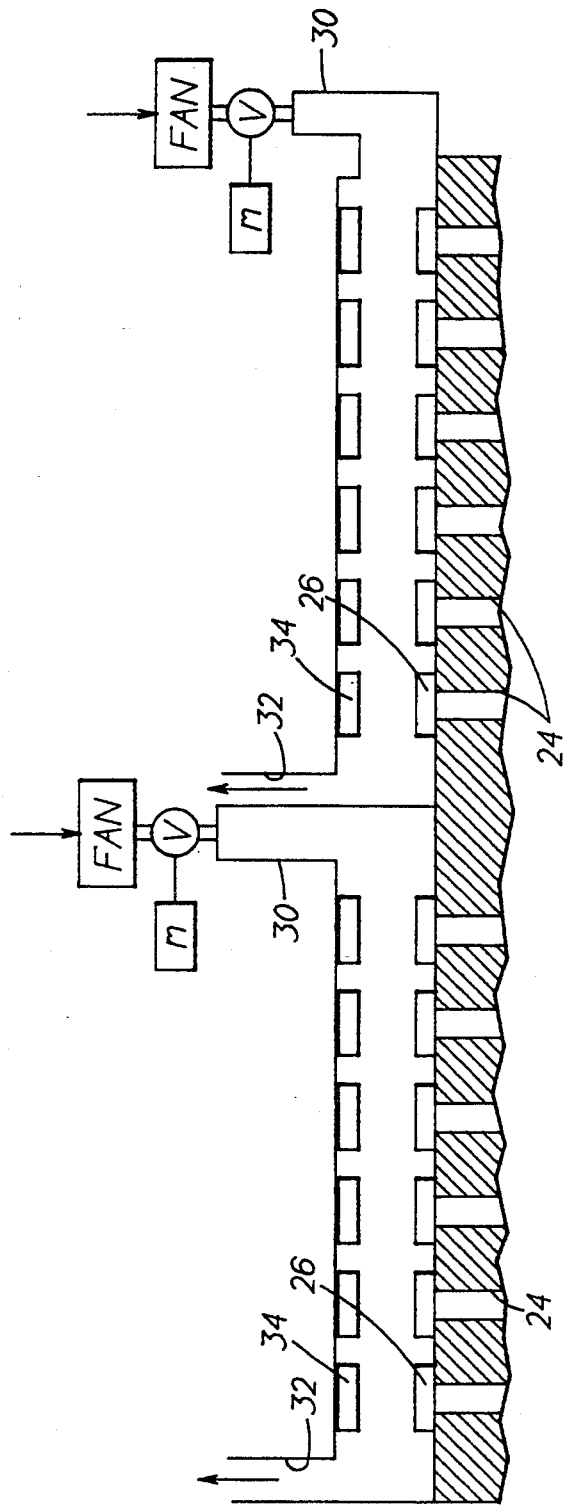
FIG. 2 is a view taken at the lines 2—2 of FIG. 1.
Figure 4:
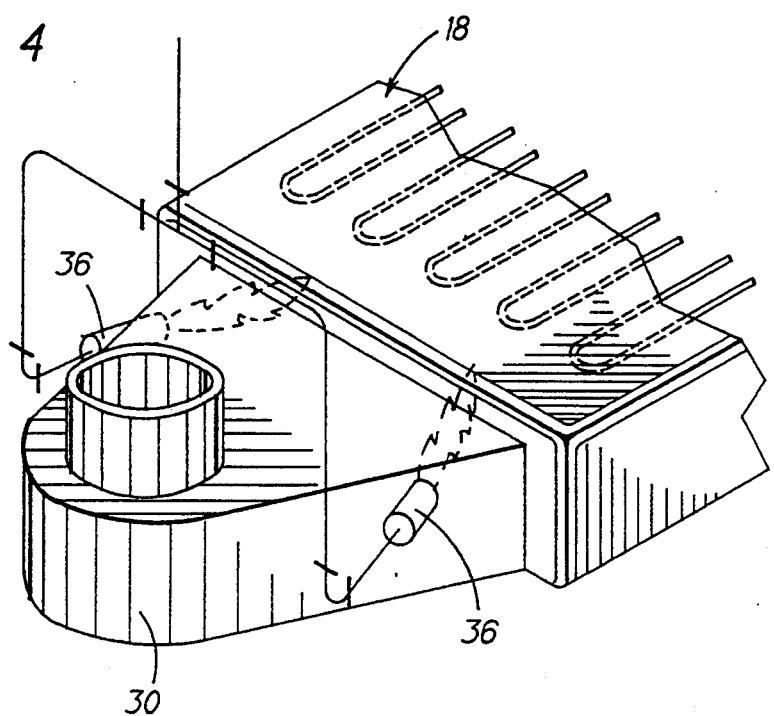
FIG. 4 is an oblique view of the top tunnel having a second embodiment.
Figure 5:
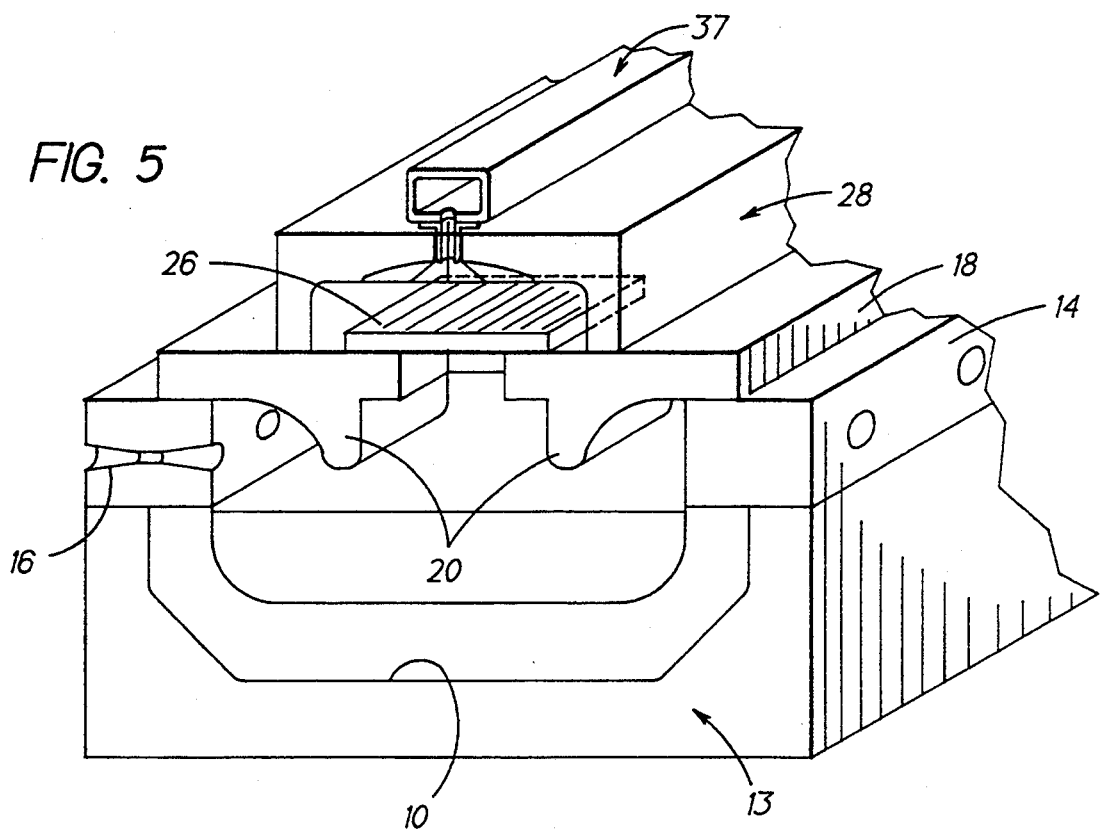
FIG. 5 is a sectional oblique view of a portion of the upstream conditioning zone having a third embodiment.

The conditioning section of a glass forehearth has a molten glass conveying channel 10 which is capped by a pair of roof portions 12 which define upstream 13 and downstream 13A cooling zones (In smaller forehearths there may be a single roof portion (and a channel of the same length) having upstream and downstream cooling zones defined within that single roof portion). A roof portion includes side blocks 14 supporting gas fired burners 16 and roof blocks 18 including a pair of downwardly projecting isolating ribs 20 which effectively divide the flow channel into a pair of side channels 21 separated by a central channel 22. At spaced locations along the central flow channel 22, openings 24 extend vertically through the roof blocks 18 (while three openings are shown in the upstream zone in FIG. 1 for purposes of clarity, six are defined in the upstream zone and six in the downstream zone in the preferred embodiment (FIG. 2). These openings 24 are sealed by closer plates 26, made from refractory material having good thermal conductivity, which are located within tunnels 28 extending over the central channel the entire length of the upstream and downstream zones. Each tunnel is closed at its ends. An intake opening 30 is defined at one end through which ambient air can be blown into the tunnel by a fan (FIG. 2) and an exhaust opening 32 is defined at the other end. Conventionally, during normal operation (an equilibrium operating state) cooling air is passed through the tunnels to lower the temperature of the closer blocks 26 to cool the air in the central channel of the upstream and downstream cooling zones and hence, the molten glass in the central channel. The upstream cooling zone, which is the right hand roof portion shown in FIGS. 1 and 2, but could be a section of a single roof portion as already noted, additionally has electrical heating elements 34 (FIG. 3) mounted on the ceiling of the tunnel overlying each of the refractory closer plates and electrically connected to a power distribution system 35. Alternatively, a pair of gas fired pilot burners 36 (FIG. 4) can be located at the inlet 30 of the upstream tunnel to heat the air introduced into the tunnel 28 or as shown in FIG. 5, a gas manifold 37 can supply gas to individual gas fired radiant burner nozzles 38 located over each of the radiation plates 26 (each electrical heating element 34 in FIG. 2 would be replaced with a gas fired radiant burner nozzle 38).

The overall length of the conditioning section is designed for a specific maximum demand (the flow rate of the molten glass at an equilibrium operating state with a specified flow) and when operated at that rate, both tunnels operate the same. Ambient air is blown into the tunnels to cool the closer blocks to transfer heat from the central flow channel. To adjust the forehearth for use when the demand is substantially reduced (half the demand, for example), the tunnel over the downstream cooling zone continues to operate in the same manner but the operation of the tunnel over the upstream cooling zone changes. The blower is turned down or off and the heating devices are turned on to heat the closure plates which radiate heat to the molten glass in the center channel to add heat to the upstream zone 13. The range of the forehearth can be extended by controlling the amount of heat generated by the heating devices. Where heating devices are located above the thermal plates, the range can be additionally controlled by operating one to six successive heating devices starting with the upstream most heating device. Where the specified range is less than the maximum range and either electric heating elements or radiant burners are used, it may be possible to use one such heating device or a number less than six arranged successively, starting at the upstream most end of the upstream cooling zone to achieve the desired range.

Figure 6:
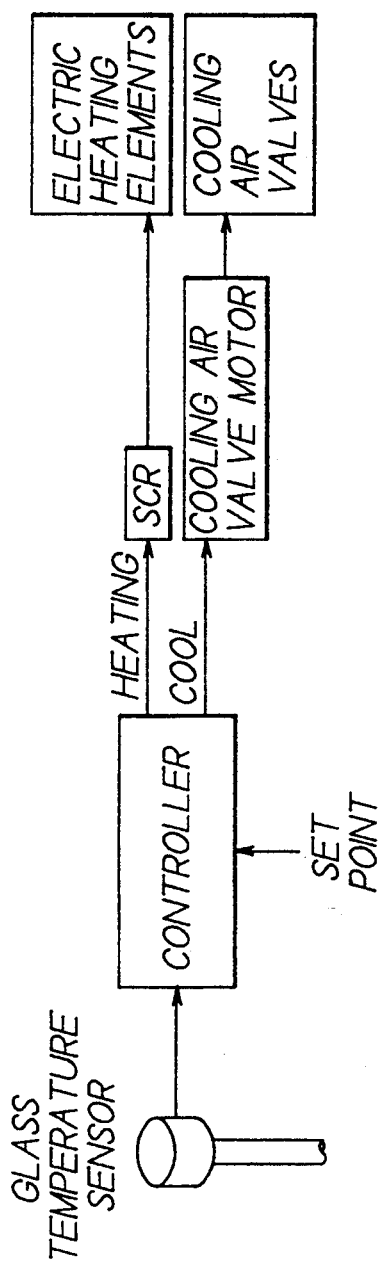
FIG. 6 is the control logic diagram for the forehearth shown in FIG. 1.

To automatically control the operation of the upstream tunnel, a glass temperature sensor (FIG. 6)

senses the temperature of the molten glass at the downstream end of the upstream conditioning zone central channel and a controller which operates relative to a set point modulates either the heating devices (electric heating elements, gas fired pilot burners or gas fired radiant burner nozzles) via an SCR or combustion control system or operates cooling air valves via a cooling air valve motor.

We claim:

1. A glass forehearth comprising upstream and downstream zones each including a lower portion including a channel for conveying molten glass, a roof member for closing said channel and including a pair of downwardly extending elongated projections which effectively divide the space between said roof and the molten glass conveyed by said channel into a pair of side flow channels and a central flow channel, means for introducing heat into said side channels, a tunnel on top of said roof member overlying said central channel, said tunnel having an inlet at the upstream end and an outlet at the downstream end a plurality of openings in said roof connecting said central channel and said tunnel, a corresponding plurality of thermal plates for closing said openings so that heat will be transferred between said tunnel and said central channel, and means for supplying cooling air to the inlet of said tunnel, and said upstream zone further comprising means for raising the temperature of at least one of said thermal plates so that heat will be transferred into said central flow channel.

2. A glass forehearth according to claim 1, wherein said means for raising the temperature of at least one of said thermal plates comprises at least one gas fired pilot burner located proximate the upstream end of said tunnel.

3. A glass forehearth according to claim 2, wherein said means for raising the temperature of at least one of said thermal plates comprises a pair of gas fired pilot burners.

4. A glass forehearth according to claim 1, wherein said means for raising the temperature of at least one of said thermal plates comprises a gas fired radiant burner located above at least one of said plurality of thermal plates.

5. A glass forehearth according to claim 4, comprising a plurality of gas fired radiant burners located above a corresponding plurality of thermal plates.

6. A glass forehearth according to claim 5 wherein said plurality of thermal plates comprises successive thermal plates including the upstream most thermal plate.

7. A glass forehearth according to claim 6, comprising a plurality of electric heating elements located above a corresponding plurality of successive thermal plates including the upstream most thermal plate.

8. A glass forehearth according to claim 1, wherein said means for raising the temperature of at least one of said thermal plates comprises an electrical heating element located above at least one of said plurality of thermal plates.

* * * * *